United States Patent
Bircann

[19]

[11] Patent Number: 6,109,302
[45] Date of Patent: Aug. 29, 2000

[54] THREE-WAY GAS MANAGEMENT VALVE

[75] Inventor: Raul Armando Bircann, Penfield, N.Y.

[73] Assignee: Delphi Technologies, Inc., Troy, Mich.

[21] Appl. No.: 09/298,811

[22] Filed: Apr. 23, 1999

[51] Int. Cl.$^7$ .................................................. F16K 11/044
[52] U.S. Cl. .......................................... 137/625.5; 251/86
[58] Field of Search ..................... 251/84, 86; 137/625.5

[56] References Cited

U.S. PATENT DOCUMENTS

| | | | |
|---|---|---|---|
| 3,511,260 | 5/1970 | Benjamin | 251/86 |
| 4,074,700 | 2/1978 | Engle | 137/625.27 |
| 4,460,015 | 7/1984 | Burt et al. | 137/625.5 |
| 5,676,345 | 10/1997 | Zurke et al. | 251/129.15 |

*Primary Examiner*—John Fox
*Attorney, Agent, or Firm*—John A. VanOphem

[57] ABSTRACT

A three way valve for selectively controlling a flow of gas between one passage and at least one of two additional passages includes a valve assembly having a body including a lower chamber communicating with first and second oppositely disposed controlled ports having first and second opposed valve seats aligned on an axis. A third inlet/outlet port also communicates with the lower chamber. A valve member in the body includes a shaft that is reciprocably movable on the axis and carries at least one head with first and second axially spaced seat engaging surfaces that are, respectively, alternately engagable with the valve seats for closing their respective ports. A biasing spring urges the valve member in a first direction for closing the first port and opening the second port. An actuator includes an armature that operatively engages the shaft for moving the valve member in a second direction for opening the first port and closing the second port. A floating bearing, located at one side of the body, supports the valve member shaft and the valve head or heads in overhung fashion. The actuator is detached from the shaft so that alignment of the valve seat engaging surfaces with their respective seats is not affected by engagement of the shaft with the actuator. The valve head or heads may be fixed or swively mounted on the shaft for positive seating on their seats.

7 Claims, 3 Drawing Sheets

THREE-WAY GAS MANAGEMENT VALVE

TECHNICAL FIELD

This invention relates to three way gas management valves for controlling the flow of gases between one passage and at least one of two additional passages.

BACKGROUND OF THE INVENTION

It is known in the art relating to three way valves to provide a reciprocable valve shaft carrying dual heads which are movable in a chamber to alternately engage axially spaced valve seats for controlling gas flow between the chamber and dual ports associated with the valve seats. However, for use in applications such as automotive vehicles, a valve of this type should be of compact and simple construction while effectively controlling gas flow with minimal leakage at the ports.

SUMMARY OF THE INVENTION

The present invention provides a three way valve for selectively controlling the flow of gas between one passage and at least one of two additional passages. A specific embodiment includes a valve assembly having a body including a lower chamber communicating with first and second oppositely disposed controlled ports, having first and second opposed valve seats aligned on an axis, and a third inlet/outlet port communicating with the lower chamber. A valve member in the body includes a shaft that is reciprocably movable on the axis and carries at least one head first and second axially spaced seat engaging portions within the lower chamber. The first and second seat engaging portions are, respectively, alternately engagable with said first and second valve seats for closing their respective ports. A biasing spring urges the valve member in a first direction for closing the first port and opening the second port. An actuator includes an armature that operatively engages the shaft for moving the valve member in a second direction for opening the first port and closing the second port. A bearing, located at one side of the body between the actuator and the first and second ports, acts as the sole support for the valve member shaft. The bearing is axially spaced from the valve heads, which are supported in overhung fashion by the bearing. The actuator is detached from the shaft so that close alignment of the actuator and shaft is not required and alignment by the bearing of the valve heads with their respective seats is not affected by engagement of the shaft with the actuator.

These and other features and advantages of the invention will be more fully understood from the following description of certain specific embodiments of the invention taken together with the accompanying drawings.

DESCRIPTION OF THE PREFERRED EMBODIMENT

Figure 1:
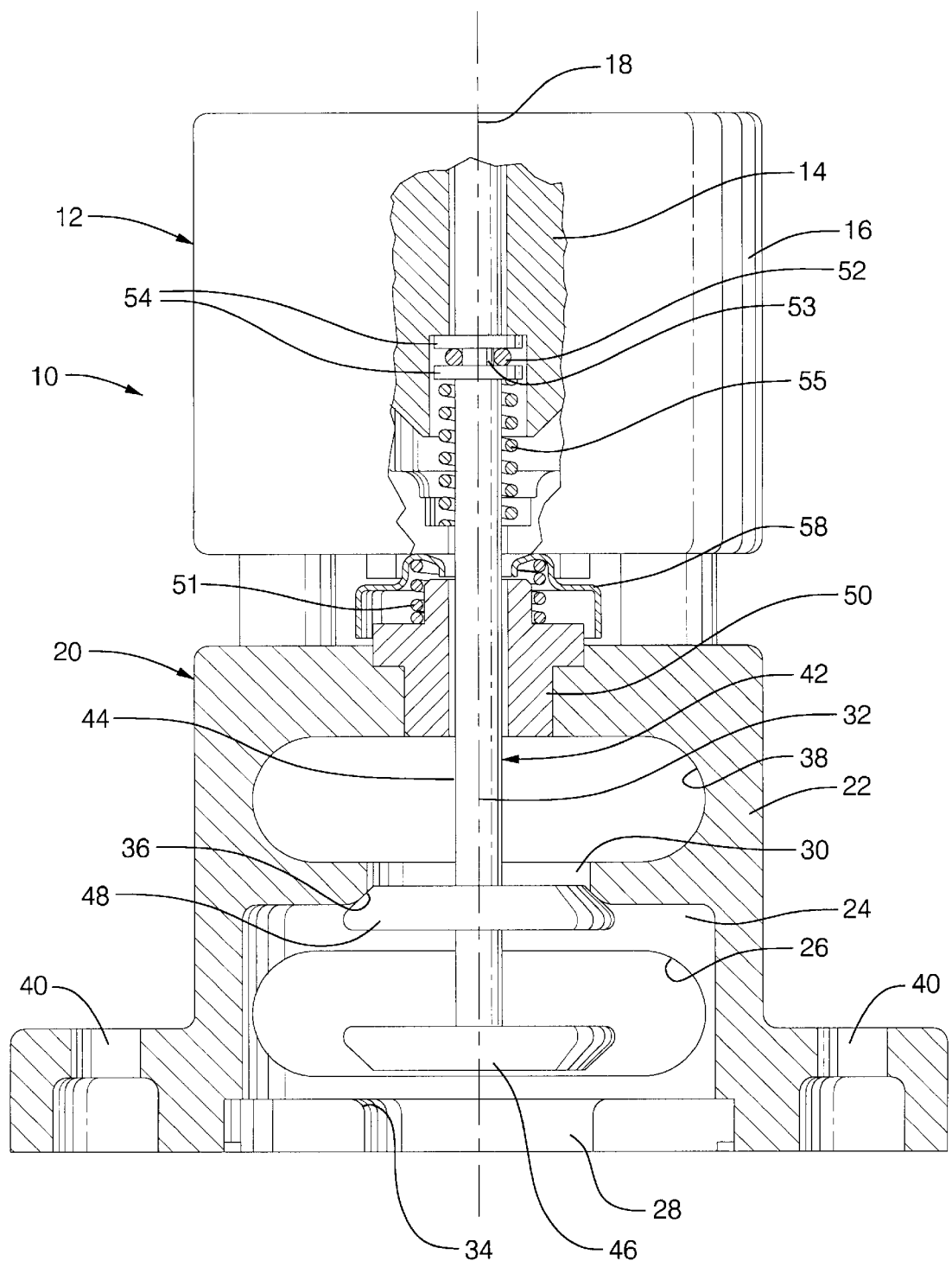
FIG. 1 is a partially schematic cross-sectional view of a first embodiment of three way gas management valve formed according to the invention.

FIG. 1 illustrates a first embodiment of three way gas management valve 10 formed according to the invention. Valve 10 includes an actuator 12 which may be of any suitable type but, as illustrated, is a solenoid actuator including an armature 14 which is movable in a housing 16 along a generally vertical axis 18.

Actuator 12 is mounted upon a valve assembly 20 having a valve body 22 including a lower chamber 24 communicating through a port 26, which may be an inlet or outlet port, with an external gas passage, not shown. Chamber 24 also communicates with first and second controlled ports 28, 30 which are disposed on opposite sides of the lower chamber 24 and aligned on an axis 32 that is approximately aligned with the axis 18 of the actuator armature 14.

Ports 28, 30 at their interfaces with the lower chamber 24, form valve seats 34, 36, respectively, which are oppositely disposed and aligned on the axis 32. Port 30 connects internally with a passage 38 that is in turn connectable externally of the body with an associated gas passage, not shown. Port 28 opens to a lower surface of the body for connection with an external gas passage, not shown, in an associated manifold or other structure on which the valve body may be mounted by fasteners placed in fastener openings 40.

Within the valve body 22, a valve member 42 is mounted for reciprocating movement along the axis 32. Valve member 42 includes a shaft 44, near a lower end of which are mounted first and second axially spaced heads 46, 48, respectively. Heads 46, 48 are located within the lower chamber 24 and are alternately engagable, upon movement of the shaft 44, with the valve seats 34, 36 to alternately close the ports 28, 30, respectively.

The valve shaft 44 is supported solely in the upper end of the housing by a floating bearing 50 having a relatively long bore for receiving the shaft and maintaining it parallel with the axis 32. A spring 51 biases a flange of the bearing 50 against the valve body 22 to limit gas leakage past the outside of the bearing. The bearing 50 preferably has a small diametral clearance that allows limited radial movement of the shaft 44 to let the valve heads 46, 48 seat solidly on their respective valve seats 34, 36. Thus, even though the bearing is mounted on the opposite side of internal passage 38 from the valve heads 46, 48, the long bearing supports the valve heads and allows them to seek alignment with their respective valve seats 34, 36. Thus, good engagement of the valve heads with the valve seats is provided when the respective valve heads are seated thereon.

Valve shaft 44 extends upward through the bearing 50 into the actuator housing 16 and through armature 14 where it preferably engages a position sensor, not shown. A groove 52 in the shaft receives a C-clip or other ring-like retainer 53. The retainer bears against upper and lower washers 54 which respectively engage the armature 14 and a biasing spring 55 mounted around the shaft to bias the valve member 42 in an upward direction, as shown in the drawings. Thus, the valve head 48 is normally biased into engagement with seat 36, closing the port 30. Clearance between shaft 44 and armature 14 decouples these elements radially as they move axially together An umbrella type shaft seal 58 is disposed on the outer end of bearing 50 between the valve body 22 and the actuator housing 16 to prevent the intrusion of contaminants into the valve and actuator.

In operation, the three way valve may be installed for use either to direct an incoming gas flow into one or the other, or both, of two outlet ports, or to receive gas flow into two inlet ports and direct it selectively into a single outlet port. Thus, inlet/outlet port 26 may be connected as an inlet port for a source of gas which is received into chamber 24. When the valve actuator is deenergized, spring 54 biases valve head 48 against valve seat 36, closing the outlet port 30 and directing gas flow from the chamber 24 through outlet port 28 to an external location not shown.

If the actuator 12 is fully energized, the armature 14 forces the valve member downward until head 46 engages seat 34, closing outlet port 28 while head 48 is moved downward away from seat 36, opening outlet port 30 and allowing gas flow from the chamber 24 into the outlet passage 38. If desired, the actuator may be controlled for selective positioning of the armature between the extremes of motion so that the valve member 42 may be positioned with both ports 28, 30 partially open so that incoming gas flow to the chamber 26 is divided between the outlet ports 28, 30.

Alternatively, the three way valve may be connected in a system with the ports 28, 30 acting as inlet ports and port 26 acting as an outlet port so that gas flow is from either or both of ports 28, 30 into the chamber 24 and out through the outlet port 26.

Figure 2:
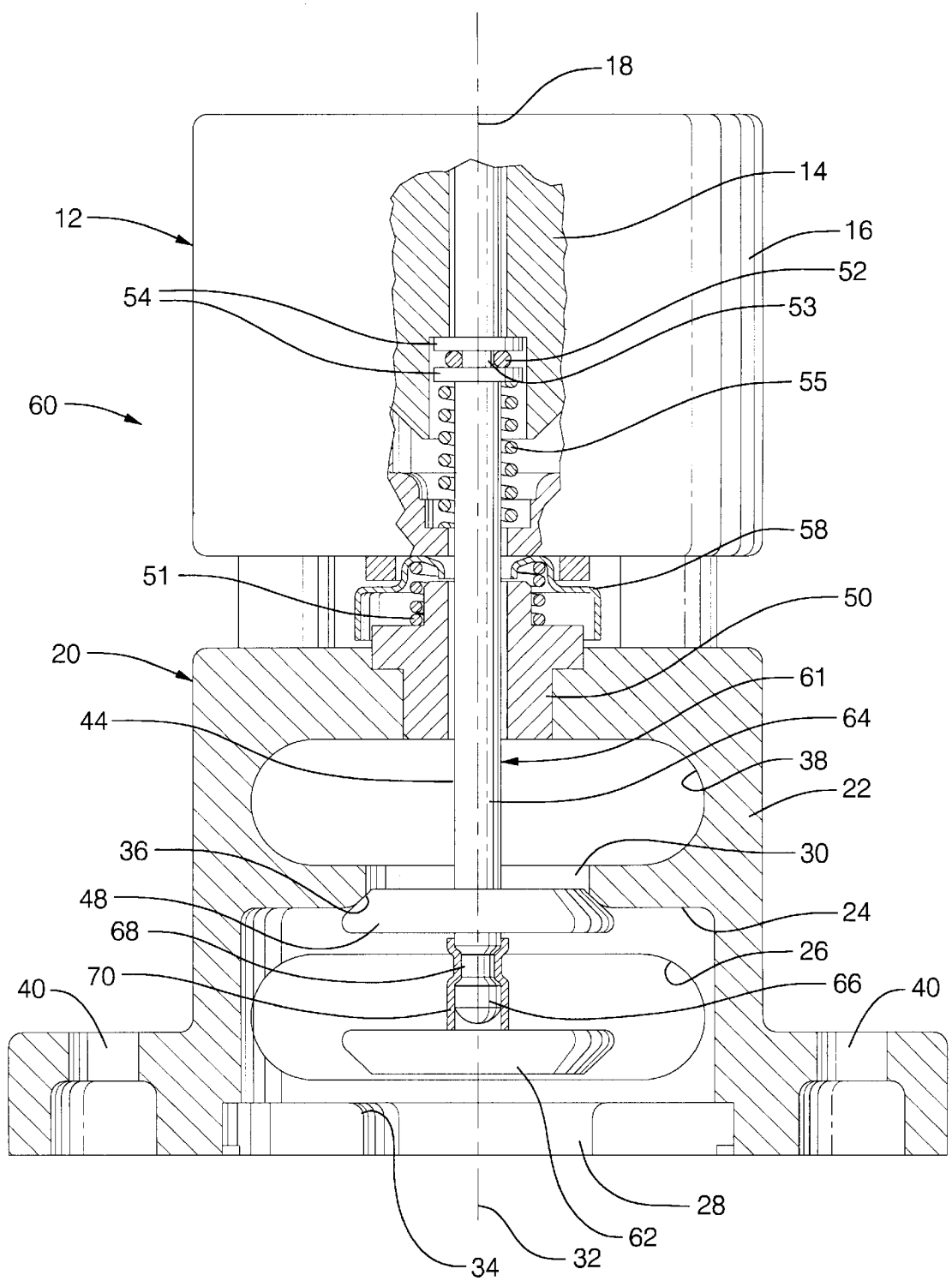
FIG. 2 is a view similar to FIG. 1 showing an alternative embodiment of three way gas management valve.

Referring now to FIG. 2 of the drawings, numeral 60 generally indicates a three way valve having many features of its construction similar to those of valve 10 shown in FIG. 1 and wherein like numerals indicate like parts. Valve 60 differs from valve 10 primarily in providing a modified valve member 61 swively mounting the lower head 62 on the valve shaft 64.

In this embodiment, the valve shaft 64 includes a contoured lower end 66 having an annular groove 68 adjacent the end. The valve head 62 connects with a short tubular shaft 70 which surrounds the lower end 66 of the shaft 64 and is mechanically secured to the lower end by upsetting a portion of the tubular shaft 70 into the annular groove 68. The connection is intentionally made slightly loose so that the lower valve head 62 is mounted to the shaft 64 with an ability to swivel slightly relative to the axis 32 on which the shaft 64 is reciprocable. Thus, when the armature 14 is urged downward by the actuator 12, the valve head 62 is forced against valve seat 34 and is able to adjust, if necessary, so as to seat solidly against the valve seat 34 and prevent any leakage through the port 28 when the port is closed.

In both embodiments illustrated in FIGS. 1 and 2, valves 10 and 60 provide three way valves operable for flow in either direction between a lower chamber 24 and two additional controlled inlet/outlet ports 28, 30. A floating bearing 50 having a relatively long bore supports a shaft 44/64, carrying in overhung fashion a pair of spaced valve heads 46/62, 48. The valve heads are aligned by the bearing for limited radial movement relative to the associated valve seats 34, 36 against which they are alternately seatable with good sealing ability.

In the embodiment of FIG. 2, sealing ability is potentially improved by allowing the lower head 62 to swivel slightly relative to the valve shaft to obtain positive seating against its respective valve seat 34 when the associated port 28 is closed by the valve. However, this feature may not be required and may incur a cost penalty in the manufacture of the valve.

Figure 3:
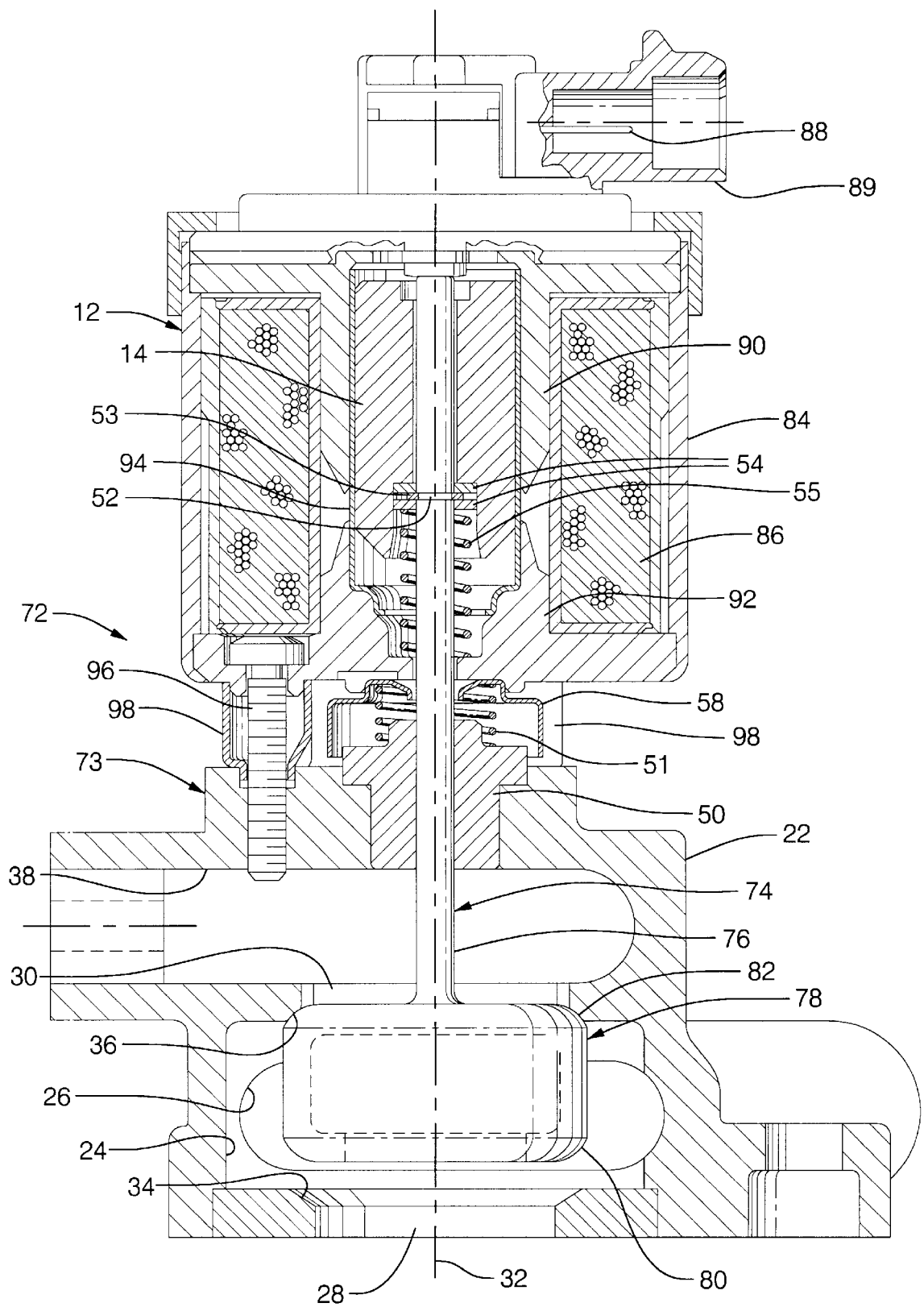
FIG. 3 is a cross-sectional view of a third embodiment of gas management valve showing various features.

FIG. 3 illustrates a third embodiment of gas management valve developed for use in appropriate automotive vehicle applications and generally indicated by numeral 72. Valve 72 includes many features similar to those of valves 10 and 60 so that like numerals indicate like parts.

A primary difference in valve 72 lies in the valve assembly 73 where a valve member 74 has a shaft 76 that carries a single hollow valve head 78 in place of the dual heads of valves 10 and 60. Head 78 has an extended length and is made hollow for manufacturing convenience and to reduce mass. However, it has axially spaced dual seat engaging surfaces 80, 82 which function like heads 46/62, 48 to alternately seat against valve seats 34, 36 of the valve body 22. Operation of valve 72 is thus identical with that described for the embodiments of FIGS. 1 and 2.

FIG. 3 further illustrates details of the construction of valve 72 which are exemplary of features that could be used in vehicle type gas management valves if desired and, in particular, in the embodiments of FIGS. 1 and 2. The actuator 12 includes a housing 84 enclosing a solenoid coil 86 connected with electrical terminals 88 in connector 89 and operable to magnetize upper and lower field poles 90, 92. An armature 14 is movable in a non-magnetic liner 94 and is connected by washers 54 and retainer 53 with a groove 52 in the valve shaft 76. A biasing spring 55 urges the armature 14 and valve member 74 upward to seat the valve head 78 against the upper valve seat 36 to close port 30 and open port 28. Operation of the solenoid actuator forces the valve head downward partially or fully against the lower valve seat 34 to close port 28 and open port 30. The actuator housing 84 is connected to the valve body 22 by screws 96 extending through spacers 98. The other elements illustrated are essentially like those of valves 10 and 60 previously described.

The illustrated valves provide three way gas management valves that are suitable for use in automotive vehicles and other appropriate applications. The valves utilize solenoid actuators adapted from those proven in use with vehicle exhaust gas recirculation (EGR) valves. The arrangement and interconnection of the solenoid armatures and the valve members are such as to minimize friction in valve movements and allow operation of the valves by a conventional 12 volt vehicle electrical system. Practical means are also provided for minimizing gas leakage from the valves to atmosphere or into the associated actuators.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A three way valve for selectively controlling a flow of gas between one passage and at least one of two additional passages, said valve comprising:

a valve assembly having a body including a chamber communicating with first and second oppositely disposed controlled ports having first and second valve seats aligned on an axis and a third inlet/outlet port communicating with the chamber;

a valve member including a shaft reciprocably movable on said axis and carrying at least one head with first and second axially spaced seat engaging portions within the chamber and respectively alternately engagable with said first and second valve seats for closing their respective ports;

biasing means urging said valve member in a first direction for closing the first port and opening the second port;

an actuator including a movable member operatively engaging the shaft for moving the valve member in a second direction for opening the first port and closing the second port; and a bearing solely supporting the valve member shaft at one side of the body between the actuator and the first and second ports and axially spaced from the valve heads which are supported in overhung fashion by the bearing;

said actuator being radially loose on said shaft so that close radial alignment of the actuator and shaft is not required and alignment of the valve heads with their respective valve seats is not impaired by engagement of the shaft with the actuator.

2. A three way valve as in claim 1 including a pair of said heads wherein said pair of heads are rigidly fixed to said shaft for self alignment of the heads with their respective valve seats.

3. A three way valve as in claim 1 including a pair of said heads wherein at least one of said heads is mounted to permit swivel motion relative to said shaft for allowing self adjustment to provide positive seating of said one head on its respective valve seat.

4. A three way valve as in claim 1 wherein said valve has only a single head on which said axially spaced seat engaging portions are disposed.

5. A three way valve as in claim 4 wherein said single head is hollow to minimize mass.

6. A three way valve as in claim 1 wherein said actuator is an armature moved in at least one direction by an electrical solenoid.

7. A three way valve as in claim 1 wherein said bearing allows for a limited amount of radial motion of the shaft, thereby facilitating self alignment of the seat engaging portions with their respective valve seats.

* * * * *